(12) United States Patent
Gupta

(10) Patent No.: US 11,140,736 B2
(45) Date of Patent: Oct. 5, 2021

(54) APPARATUS AND METHOD FOR BIDIRECTIONAL IP FLOW MOBILITY CONTROL

(71) Applicant: Intel Corporation, Santa Clara, CA (US)

(72) Inventor: Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 16/447,855

(22) Filed: Jun. 20, 2019

(65) Prior Publication Data

US 2019/0373662 A1 Dec. 5, 2019

Related U.S. Application Data

(63) Continuation of application No. 15/538,175, filed as application No. PCT/US2015/038083 on Jun. 26, 2015, now abandoned.

(Continued)

(51) Int. Cl.
*H04W 76/16* (2018.01)
*H04W 28/18* (2009.01)
(Continued)

(52) U.S. Cl.
CPC .......... *H04W 76/16* (2018.02); *H04W 28/18* (2013.01); *H04W 80/04* (2013.01); *H04W 88/06* (2013.01); *H04W 88/16* (2013.01)

(58) Field of Classification Search
CPC ...... H04W 28/18; H04W 76/16; H04W 80/04
See application file for complete search history.

(56) References Cited

U.S. PATENT DOCUMENTS

2012/0069817 A1 3/2012 Ling et al.
2013/0070596 A1 3/2013 Yet et al.
(Continued)

FOREIGN PATENT DOCUMENTS

| CN | 103392363 A | 11/2013 |
| CN | 103988531 A | 8/2014 |
| WO | 2010069601 A1 | 6/2010 |

OTHER PUBLICATIONS

S2-142567, UE-Initiated S2a NB_IFOM, Jul. 2014, Qualcomm, pp. 1-8. (Year: 2014).*

(Continued)

*Primary Examiner* — Steven H Nguyen
(74) *Attorney, Agent, or Firm* — Schwabe, Williamson & Wyatt, P.C.

(57) ABSTRACT

Embodiments of the present disclosure describe apparatuses and methods for bidirectional IP flow mobility control. Various embodiments may include a UE with signaling circuitry to establish a multi-access packet data network (PDN) connection with at least two radio access technologies to enable Internet Protocol (IP) flow mobility based on the at least two radio access technologies. The UE may further include processing circuitry to control IP flow mobility between the UE and a PDN Gateway (PGW) based on a bidirectional signaling protocol that enables a coexistence of IP flow mobility initiated based on network policies and IP flow mobility initiated based on UE policies. Other embodiments may be described and/or claimed.

9 Claims, 7 Drawing Sheets

Related U.S. Application Data

(60) Provisional application No. 62/105,456, filed on Jan. 20, 2015.

(51) Int. Cl.
*H04W 88/16* (2009.01)
*H04W 88/06* (2009.01)
*H04W 80/04* (2009.01)

(56) References Cited

U.S. PATENT DOCUMENTS

| | | | |
|---|---|---|---|
| 2014/0086211 A1* | 3/2014 | Liu | H04L 45/38 370/331 |
| 2014/0153504 A1 | 6/2014 | Wang et al. | |
| 2015/0195863 A1 | 7/2015 | Reznik et al. | |
| 2015/0382393 A1 | 12/2015 | Kiss | |
| 2016/0295465 A1* | 10/2016 | Rommer | H04W 36/0027 |
| 2017/0201453 A1 | 7/2017 | Deng | |
| 2017/0238223 A1 | 8/2017 | Zhou et al. | |
| 2017/0310584 A1 | 10/2017 | Kim et al. | |
| 2017/0339614 A1* | 11/2017 | Kim | H04W 8/20 |
| 2019/0014529 A1* | 1/2019 | Karampatsis | H04W 40/36 |

OTHER PUBLICATIONS

S2-142566, Basic Principles for NB_IFOM solutions, Jul. 2014, Qualcomm, pp. 1-5. (Year: 2014).*
S2-141608, Revised functionality for current NB_IFOM TR, Qualcomm, pp. 1-12. (Year: 2014).*
International Search Report and Written Opinion for International Application No. PCT/US2015/038083 dated Sep. 22, 2015; 16 pages.
Motorola Mobility; "UE-Initiated IP Flow Mobility without Exchanging Routing Rules," Agenda Item: 7.7; S2-144125; SA WG2 Meeting #106; Nov. 17-21, 2014, San Francisco, USA; 7 pages.
Intel, Broadcom; "Solution for loss of WLAN coverage for IP flow Mobility," Agenda Item: 7.7; S2-144108; SA WG2 Meeting #106; San Francisco (CA), USA, Nov. 17-21, 2014; 4 pages.
Motorola Mobility; "Update of Solution based on Implicitly-Triggered IP Flow Mobility," Agenda Item: 7.7; S2-143599; SA WG2 Meeting #105; Oct. 13-17, 2014, Sapporo, Japan; 5 pages.
Motorola Mobility; "Clarafications and Enhancements for Implicitly-Triggered IP Flow Mobility," Agenda Item: 7.7; S2-143287; SA WG2 Meeting #105, Oct. 13-17, 2014, Sapporo, Japan; 4 pages.
Alcatel-Lucent, et al.; "Revised NBIFOM Service and architectural requirements in TR 23.861," Agenda Item: 7.7; S2-142276; SA WG2 Meeting #103; May 19-23, 2014, Phoenix, Arizona, USA; 6 pages.
3GPP, "Technical Specification Group Services and System Aspects; Network based IP flow mobility (Release 13)," 3GPP TR 23.861 V1.12.0 (Dec. 2014), Dec. 17, 2014, Lte, 121 pages.
3GPP, "Technical Specification Group Core Network and Terminals; Mobility management based on Dual-Stack Mobile IPv6; Stage 3 (Release 12)," 3GPP TS 24.303 V12.0.0 (Sep. 2014), Sep. 26, 2014, Lte Advanced, 52 pages.
3GPP, "Technical Specification Group Core Network and Terminals; Mobility between 3GPP Wireless Local Area Network (WLAN) interworking (I-WLAN) and 3GPP systems; General Packet Radio System (GPRS) and 3GPP I-WLAN aspects; Stage 3 (Release 12)," 3GPP TS 24.327 V12.0.0 (Sep. 2014), Sep. 26, 2014, LTE Advanced, 24 pages.
3GPP, "Technical Specification Group Core Network and Terminals; Access Network Discovery and Selection Function (ANDSF) Management Object (MO) (Release 12)," 3GPP TS 24.312 V12.7.0 (Dec. 2014), Dec. 21, 2014, Lte Advanced, 371 pages.
3GPP, "Technical Specification Group Services and System Aspects; Architecture enhancements for non-3GPP accesses (Release 13)," 3GPP TS 23.402 V13.0.0 (Dec. 2014), Dec. 17, 2014, Lte Advanced, 290 pages.
LAN/MAN Standards Committee, "Part 11: Wireless LAN Medium Access Control (MAC) and Physical Layer (PHY) Specifications Amendment 5: Television White Spaces (TVWS) Operation," IEEE Computer Society, IEEE Std 802.11af™-2013, IEEE Standard for Information technology—Telecommunications and information exchange between systems Local and metropolitan area networks—Specific requirements, 198 pages.
LAN/MAN Standards Committee, "Part 16: Air Interface for Broadband Wireless Access Systems," IEEE 802.16-2009—IEEE Standard for Local and metropolitan area networks, 2,065 pages.
European Patent Office—Article 94(3) dated Aug. 31, 2018 from European Patent Application No. 15738201.1, 7 pages.
Japanese Patent Office—Notice of Decision to Refuse dated Mar. 5, 2019 from Japanese Patent Application No. 2017-528942, 6 pages.
U.S. Patent Office—Office Action dated Oct. 9, 2018 from U.S. Appl. No. 15/538,175, 16 pages.
U.S. Patent Office—Final Office Action dated Mar. 18, 2019 from U.S. Appl. No. 15/538,175, 17 pages.
U.S. Patent Office—Advisory Action dated Jun. 14, 2019 from U.S. Appl. No. 15/538,175, 4 pages.
Brazilian Patent Office—Office Action dated Sep. 1, 2020 from Brazilian Patent Application No. BR112017012165-4, 6 pages.
Japan Patent Office—Decision of Rejection dated Jul. 30, 2019 from Japanese Patent Application No. 2017-528942, 12 pages.
European Patent Office—Article 94(3) dated Feb. 3, 2020 from European Patent Application No. 15738201.1, 5 pages.
European Patent Office—Article 94(3) dated Jun. 24, 2019 from European Patent Application No. 15738201.1, 5 pages.
Indian Patent Office—Office Action dated Jul. 30, 2020 from Indian Patent Application No. 201747020604, 6 pages.

* cited by examiner

APPARATUS AND METHOD FOR BIDIRECTIONAL IP FLOW MOBILITY CONTROL

CROSS REFERENCE TO RELATED APPLICATIONS

The present application is a continuation of U.S. patent application Ser. No. 15/538,175, filed Jun. 20, 2017, entitled "APPARATUS AND METHOD FOR BIDIRECTIONAL IP FLOW MOBILITY CONTROL," which is national phase entry under 35 U.S.C. § 371 of International Application No. PCT/US2015/038083, filed Jun. 26, 2015, entitled "APPARATUS AND METHOD FOR BIDIRECTIONAL IP FLOW MOBILITY CONTROL", which claims priority to U.S. Provisional Patent Application No. 62/105,456, filed Jan. 20, 2015, entitled "NBIFOM CONTROL PROTOCOL AND SUPPORT FOR CO-EXISTENCE MECHANISMS," the entire disclosures of which are hereby incorporated by reference in its entireties for all purposes.

FIELD

Embodiments of the present disclosure generally relate to the field of wireless communication, and more particularly, to apparatuses and methods for bidirectional IP flow mobility control.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

The 3rd Generation Partnership Program (3GPP) Release-13 (Rel-13) Service & System Aspects (SA) work item number 2 (SA2) on Network based Internet Protocol (IP) flow mobility (NBIFOM) defines the IP flow mobility functionality for Proxy Mobile (PM) IPv6 (PMIPv6 or PMIP) and general packet radio service (GPRS) tunneling protocol (GTP)-based S2a and S2b interfaces over wireless local area network (WLAN). So far, moving individual IP flows belonging to the same packet data network (PDN) connection across different accesses (e.g., 3GPP access and WLAN access) may be done only by using client-based IP Flow Mobility (IFOM) Management protocols such as DSMIPv6.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
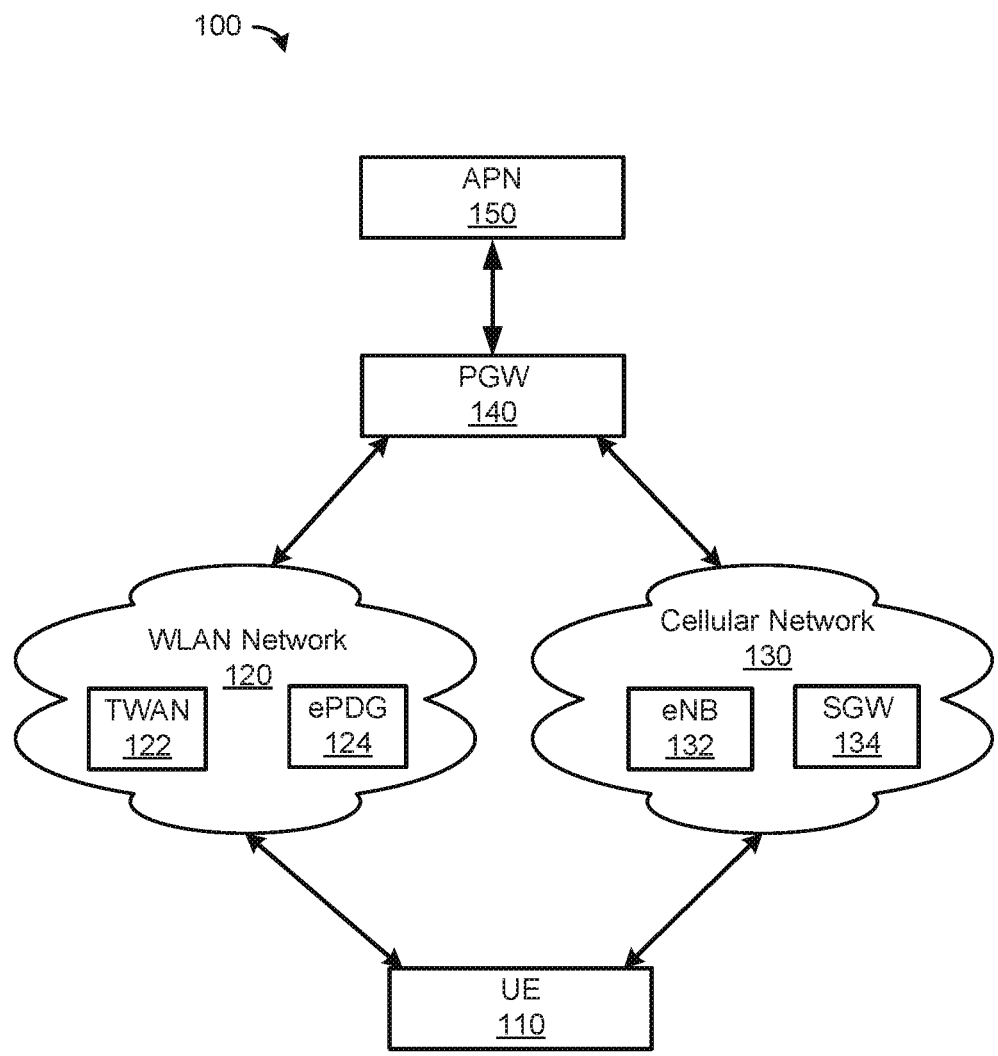
FIG. 1 schematically illustrates a wireless communication system enabled to communicate with an IP Flow mobility Control Protocol (IFCP), in accordance with various embodiments.

Embodiments of the present disclosure describe apparatuses and methods for bidirectional Internet Protocol (IP) Flow Mobility (IFOM) control. Various embodiments may include a user equipment (UE) with signaling circuitry to establish a multi-access packet data network (PDN) connection with at least two radio access technologies to enable IP flow mobility based on the at least two radio access technologies. The UE may further include processing circuitry to control IP flow mobility between the UE and a Packet Data Network Gateway (PGW) based on a bidirectional signaling protocol that enables a coexistence of IP flow mobility initiated based on network policies and IP flow mobility initiated based on UE policies. These and other aspects of the present disclosure will be more fully described below.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As used herein, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In various embodiments, a module may be implemented in any combination of firmware and hardware.

FIG. 1 schematically illustrates a wireless communication system 100 enabled to communicate with an IP Flow mobility Control Protocol (IFCP), in accordance with various embodiments. The wireless communication system 100 may include user equipment (UE) 110, WLAN network 120, cellular network 130, PGW 140, and access point name (APN) 150 to enable IP flow mobility, such as moving some IP flows from one path to another path within a multi-access packet data network (PDN) connection. Further, such IP flow mobility may be initiated, negotiated, and managed by a bidirectional signaling protocol that enables a coexistence of IP flow mobility initiated based on network policies and IP flow mobility initiated based on UE policies.

Mobile communication technology may rely on various standards and protocols to transmit data between UE 110 and WLAN network 120 or cellular network 130. Wireless communication system standards and protocols may include, for example, the 3GPP LTE; the Institute of Electrical and Electronics Engineers (IEEE) 802.16 standard, which is commonly known to industry groups as worldwide interoperability for microwave access (WiMAX); and the IEEE 802.11 standard, which is commonly known as Wi-Fi. In a 3GPP radio access network (RAN), according to long term evolution (LTE), the base station may be referred to as an evolved Node B (also commonly denoted as eNodeB, or eNB). Although the present disclosure is presented with terminology and examples generally directed toward 3GPP systems and standards, the teachings disclosed herein may be applied to any type of wireless network or communication standard.

UE 110 may communicate with other devices via multiple radio access technologies. In some embodiments, UE 110 may be a mobile communication device, a subscriber station, or another device that is configured to communicate with the WLAN network 120 and/or cellular network 130, in conformance with an appropriate protocol (e.g., a multiple-input/multiple-output (MIMO) communication scheme). As an example, in various embodiments, UE 110 may access cellular network 130 via a radio link with a base station, e.g., an eNB 132 in cellular network 130. A downlink (DL) transmission may be a communication from eNB 132 to UE 110. An uplink (UL) transmission may be a communication from UE 110 to eNB 132.

In various embodiments, WLAN network 120 may include various combinations of wireless personal area networks (WPANs), wireless local area networks (WLANs), wireless metropolitan area networks (WMANs), and/or wireless wide area networks (WWANs). The WLAN network 120 may provide an interface for apparatus 100 to operate on unlicensed spectrum with variants of IEEE 802.x-based radio access technologies, such as WiFi or WiMAX, to access at least one WLAN, as an example. In some embodiments, WLAN network 120 may also enable apparatus UE 110 to communicate through short range wired or wireless communications such as IrDA, Bluetooth™, near field communications (NFC), Universal Serial Bus (USB), amongst others.

In various embodiments, WLAN network 120 may include Trusted Wireless Access Gateway (TWAN) 122 or Evolved Packet Data Gateway (ePDG) 124. Non-3GPP access may include access from Wi-Fi, WiMAX, etc., which may be trusted and/or untrusted non-3GPP access. Trusted Wi-Fi access may include an operator-built Wi-Fi access with encryption in the Wi-Fi radio access network (RAN) and a secure authentication method. In some embodiments, UE 110 may connect through TWAG 122 to WLAN network 120. TWAG 122 in turn may connect to PGW 140 in an Evolved Packet Core (EPC) through a secure tunnel (e.g., GTP, MIP, or PMIP).

In various embodiments, untrusted access may include other type of Wi-Fi access that does not provide sufficient security mechanisms such as authentication and radio link encryption. The untrusted model may require an Internet Protocol Security (IPSec) client in UE 110. UE 110 may connect to ePDG 124 through a secure IPSec tunnel. ePDG 124 in turn may connect to PGW 140 wherein each user session may be transported through a secure tunnel (e.g., GTP or PMIP).

The cellular network 130 may be connected to UE 110 and PGW 140. In various embodiments, the cellular network 130 may include one or more radio access networks, such as a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, a radio access network may include GSM Enhanced Data rates for GSM Evolution (EDGE) Radio Access Network (GERAN), Universal Terrestrial Radio Access Network (UTRAN), or Evolved UTRAN (E-UTRAN). The cellular network 130 may operate in accordance with other network technologies in other embodiments. In various embodiments, UE 110 may use an interface to communicate with cellular network 130 on licensed spectrum with cellular radio access technologies, such as CDMA, WCDMA, UMTS, GSM, or LTE.

In various embodiments, cellular network 130 may include eNB 132 and serving gateway (SGW) 134. In some embodiments, SGW 134 may communicate with eNB 132, e.g., over an S1 interface. The S1 interface may be similar to the S1 interface as defined in 3GPP TS 36.410 V11.1.0 (2013 September) and may support a many-to-many relation between SGW 134 and eNB 132. For example, different operators may simultaneously operate the same eNB in a network sharing setting. In some embodiments, communication between eNB 132 and UE 110 may be facilitated via the SGW 134. SGW 134 may be configured to manage signaling exchanges, e.g., authentication of UE 110, or perform other actions associated with establishment of a communication link between UE 110 and PGW 140. In some embodiments, SGW 134 may be responsible for tracking and paging user equipment, e.g., when UE 110 is in an idle mode.

The PGW 140 may provide a gateway for UE 110 to access many other packet data networks (e.g., Internet) from, e.g., UE 110's mobile packet core network, such as cellular network 130. In various embodiments, per flow mobility in a multi-access PDN connection may be triggered by UE 110 or PGW 140, using a bidirectional signaling protocol, such as the IFCP disclosed herein. The IFCP may be terminated in UE 110 or PGW 140. IFCP messages may be transported at layer 3 over UDP/IP or TCP/IP. In some embodiments, the IFCP protocol may be used after a multi-access PDN connection has been established (e.g., over 3GPP and WLAN accesses) in order to support UE-initiated and network-initiated IP flow mobility over a multi-access PDN connection.

In various embodiments, UE 110 may negotiate the NBIFOM capability with PGW 140 when a new PDN connection is established. UE 110 may transfer routing rules to PGW 140 and trigger UE-initiated IP flow mobility. UE 110 may accept or reject IP flow mobility request initiated by PGW 140. UE 110 may notify PGW 140 when UE 110 is out of WLAN coverage and in turn suspend some flows. By the same token, UE 110 may notify PGW 140 when UE 110 is back in coverage and resume flows.

In various embodiments, PGW 140 may similarly negotiate the NBIFOM capability when a new PDN connection is established, trigger network-initiated IP flow mobility, and transfer routing rules to UE 110. Further, PGW 140 may also accept or reject UE-initiated IP flow mobility.

In various embodiments, the underlying layer-2 links of a multi-access PDN connection between UE 110 and PGW 140 may be logically combined so that these layer-2 links may appear as a single interface to the IP protocol stack. In various embodiments, PGW 140 may support the multi-access PDN connection to the same APN, such as APN 150.

In various embodiments, APN 150 may identify the target PDN that UE 110 may target for communication. In addition to identifying the target PDN, APN 150 may define the type of service provided by the PDN, e.g. connection to Wireless Application Protocol (WAP) server and/or Multimedia Messaging Service (MMS). In various embodiments, APN 150 may include a gateway between a GPRS, 3G, or 4G mobile network and another computer network. As an example, APN 150 may be a Voice over LTE (VoLTE) APN. As another example, APN 150 may be a IP Multimedia Subsystem (IMS) Services APN. As yet another example, APN 150 may be a type of Voice over Data (VoD) Services APN. As yet another example, APN 150 may be an Internet APN.

For ease of illustration, various descriptions herein are provided to conform to 3GPP in the communication system 100; however, the subject matter of the present disclosure is not limited in this regard, and the embodiments disclosed herein may be advantageously applied to other wired or wireless communication protocols or networks.

Figure 2:
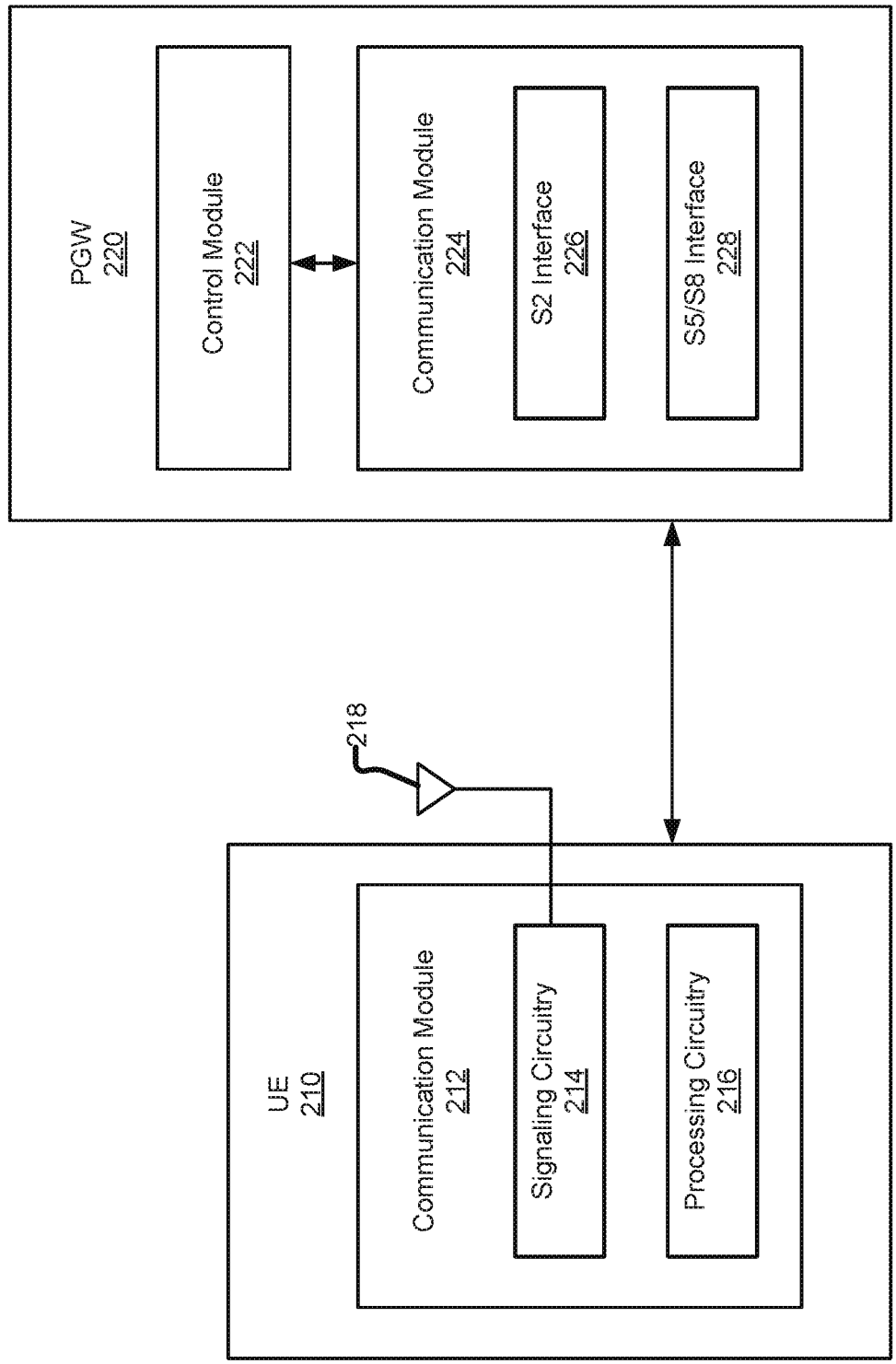
FIG. 2 is a schematic block diagram illustrating a user equipment (UE) and a Packet Data Network Gateway (PGW) enabled to communicate with the IFCP, in accordance with various embodiments.

FIG. 2 is a schematic block diagram illustrating a UE and a PGW enabled to communicate with the IFCP, in accordance with various embodiments. The UE 210 may be similar to, and substantially interchangeable with, UE 110 of FIG. 1. The PGW 220 may be similar to, and substantially interchangeable with, PGW 140 of FIG. 1.

In various embodiments, UE 210 may include one or more antennas 218 and communication module 212. In various embodiments, communication module 212 may include signaling circuitry 214 and processing circuitry 216 as shown. In various embodiments, signaling circuitry 214 may be in a separate module. In various embodiments, processing circuitry 216 may be in a separate module. In various embodiments, signaling circuitry 214 and processing circuitry may be in a separate module or may be both in different modules. In various embodiments, the communication module 212 may be coupled with the antennas 218 to facilitate over-the-air communication of signals between UE 210 and other wireless devices. For example, the signaling circuitry 214 may be configured to provide various signal processing operations on the signal to the antennas 218 with suitable characteristics. In various embodiments, operations of the signaling circuitry 214 may include, but are not limited to, filtering, amplifying, storing, modulating, demodulating, and transforming, and like operations/processes, by way of example and not limitation.

In some embodiments, the UE 210 may include one or more antennas 218 to concurrently utilize radio resources of multiple respective component carriers. For example, the UE 210 may be configured to communicate using orthogonal frequency division multiple access (OFDMA) (in, e.g., downlink communications) and/or single-carrier frequency-division multiple access (SC-FDMA) (in, e.g., uplink communications). In some embodiments, the UE 210 may use the signaling circuitry 214 to communicate with another UE via LTE ProSe or LTE Direct.

The signaling circuitry 214 may be configured to receive signals from the antennas 218, and then transmit the signals to other components of the UE 210, for example, the processing circuitry 216 for internal processing. In various embodiments, the processing circuitry 216 may enable IP flow mobility between UE 210 and PGW 220 based at least in part on an IFCP that enables a coexistence of UE-initiated IP flow mobility and PDN-GW-initiated IP flow mobility with a multi-access packet data network (PDN) connection.

In some embodiments, the processing circuitry 216 of the UE 210 may send an IFCP capability request, regarding the type of network based IP flow mobility (NBIFOM) capability supported by the PGW, to the PGW 220, and the PGW 220 may send a response to the UE 210 where the response provides information about the capability of the PGW 220. The processing circuitry may receive an IFCP capability request, regarding the type of NBIFOM capability supported by the UE 210, from the PGW 220, and the UE 210 may send a response to the PGW 220 where the response provides information about the capability of the UE 210.

In some embodiments, the processing circuitry 216 may receive an IFCP mode request from the PGW to indicate a mode of operation for IP flow mobility for Network-initiated IP flow mobility. The processing circuitry 216 may send an IFCP mode request to the PGW to indicate a mode of operation of IP flow mobility for UE-initiated IP flow mobility. The processing circuitry 216 may receive an IFCP mode response from the PGW to indicate a mode of operation of IP flow mobility for UE-initiated IP flow mobility. The processing circuitry 216 may send an IFCP mode response to the PGW to indicate a mode of operation for IP flow mobility for Network-initiated IP flow mobility.

The processing circuitry 216 may send an IFCP suspend request to the PGW to suspend the multi-access PDN. The processing circuitry 216 may send an IFCP resume request to the PGW to resume the multi-access PDN.

The processing circuitry 216 may receive an IFCP flow mobility request to negotiate routing rules between the UE and the PGW. The processing circuitry 216 may transmit an IFCP flow mobility request to negotiate routing rules between the UE and the PGW. The processing circuitry 216 may receive an IFCP flow mobility response to negotiate routing rules between the UE and the PGW. The processing circuitry 216 may transmit an IFCP flow mobility response to negotiate routing rules between the UE and the PGW.

The processing circuitry 216 may prioritize Access Network Discovery and Selection Function (ANDSF) rules over RAN rules for routing traffic. The processing circuitry 216 may prioritize Network-initiated routing rules over UE-initiated routing rules.

Figure 6:
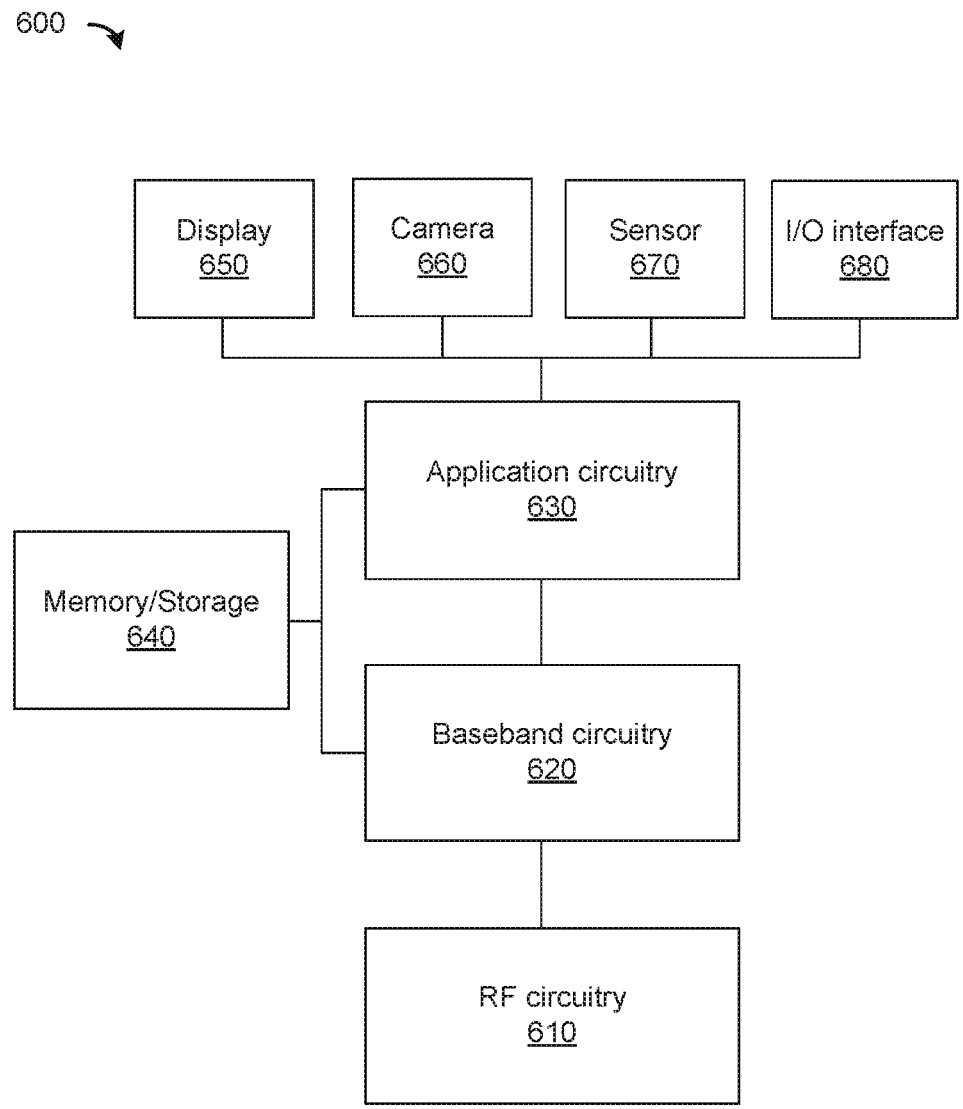
FIG. 6 is a block diagram of an example computing device that may be used to practice various embodiments described herein.

Some or all of the signaling circuitry 214 and/or processing circuitry 216 may be included in, for example, application circuitry 630, radio frequency (RF) circuitry 610 or baseband circuitry 620 as described below with respect to FIG. 6. In various embodiments, the UE 210 may be, may include, or may be included in a single sensor device, a cellular telephone, a personal computer (PC), a notebook, an ultrabook, a netbook, a smartphone, an ultra mobile PC (UMPC), a handheld mobile device, a universal integrated circuit card (UICC), a personal digital assistant (PDA), a Customer Premise Equipment (CPE), a tablet computing device, or other consumer electronics such as MP3 players, digital cameras, and the like. In some embodiments, the UE 210 may include a mobile station, as defined by IEEE 802.16e (2005 or 802.16m (2009) or some other revision of the IEEE 802.16 standard, or user equipment, as defined by 3GPP LTE Release 8 (2008), Release 9 (2009), Release 10 (2011), Release 12 (2014), Release 13 (under development), or some other revision or release of the 3GPP LTE standards.

In various embodiments, PGW 220 may include control module 222 and communication module 224, coupled with each other, to manage Internet Protocol (IP) flow mobility between the UE 210 and the PDN-GW based at least in part on a user plane bidirectional signaling protocol that enables a coexistence of a PDN-GW-initiated IP flow mobility type and a UE-initiated flow mobility type.

In some embodiments, communication module 224 may include an S2 interface 226 and an S5/S8 interface 228 to communicate with communication networks with different radio technologies. In various embodiments, PGW 220 may include S2 control and data plane stacks to support the S2 interface 226 (e.g., including S2a or S2b interface) to communicate with, e.g., TWAN 122 or ePDG 124 of FIG. 1. On the other hand, PGW 220 may include S5/S8 control and data plane stacks to support S5/S8 interface 228 to communicate with, e.g., SGW 134 of FIG. 1. In some embodiments, the integrated control/data plane stacks for S5/S8 interface 228 may include IP, UDP, eGTP-C, etc.

In some embodiments, IFCP messages may be transported via S2a interface (e.g., via GTP or PMIPv6) or an S2b interface (e.g., via GTP or PMIPv6) through a WLAN network between UE 210 and PGW 220. In some embodiments, IFCP messages may be transported via an S5 interface through a cellular network between UE 210 and PGW 220. In various embodiments, IFCP may impact only UE 210, PGW 220, and the Policy Control and Charging Rules Function (PCRF) (not shown), e.g., when dynamic Policy and Charging Control (PCC) is deployed. In various embodiments, in order to establish an IFCP session, the IP address of PGW 220 may be provided to UE 210 during PDN connection establishment. Further, IFCP may use IPSec or Datagram Transport Layer Security (DTLS) for security between UE 210 and PGW 220.

Figure 3:
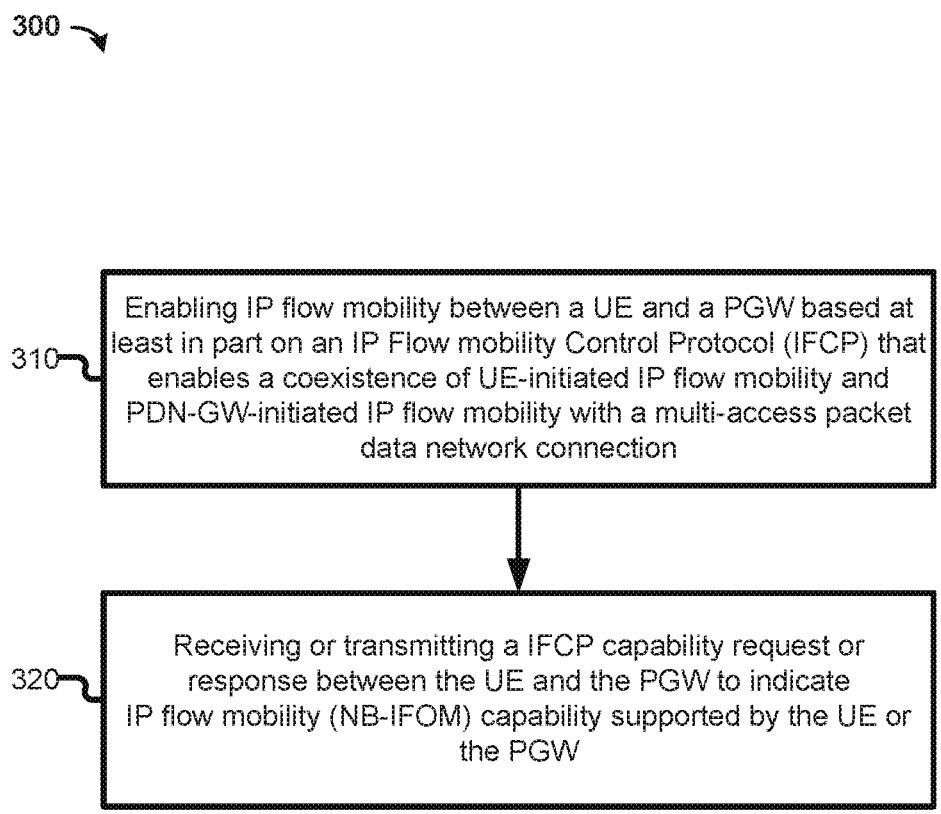
FIG. 3 is a flowchart illustrating a process for enabling IP flow mobility between a UE and a PGW, in accordance with various embodiments.

FIG. 3 is a flowchart illustrating a process for enabling IP flow mobility between a UE and a PGW, in accordance with various embodiments. The process 300 may be performed by a UE, e.g., UE 110 of FIG. 1 or UE 210 of FIG. 2. In various embodiments, the process 300 may enable a UE to utilize the IFCP to manage IP flow mobility.

The process 300 may include, at 310, enabling IP flow mobility between a UE and a PGW based at least in part on an IFCP that enables a coexistence of UE-initiated IP flow mobility and Network-initiated IP flow mobility with a multi-access packet data network (PDN) connection.

In various embodiments, the IFCP may enable a co-existence mechanism between Network (PCC/PCRF Rules) and Client (ANDSF, RAN rules) initiated IP Flow Mobility triggers and policies. As an example, in various embodiments, the IFCP may enable a UE and a PGW to negotiate and exchange routing filters between the UE and the PGW. Thus, IP flow mobility may be initiated based on network policies (PCC/PCRF rules) or based on client policies such as (ANDSF or RAN rules) to support network based flow mobility. Correspondingly, triggers for IP flow mobility may be initiated in the UE and the network. The IFCP disclosed herein may provide such a mechanism for co-existence between these scenarios so that conflicts may be resolved and different deployment scenarios may be supported.

The IFCP may be supported at the layer 3 over UDP/IP or TCP/IP. As a user plane signaling solution, the UE or PGW may notify the peer entity (e.g., PGW/UE respectively) of a change in IP flow routing preference via the IFCP. This user plane signaling solution may enable IP flow mobility by only impacting a small number of entities, for example, UE, P-GW and PCRF and without affecting other network entities (e.g., MME, S-GW, TWAG, ePDG, AAA server and corresponding protocols (GTP-C, EAP, WLCP, IKEv2 and NAS)). The IFCP may also enable WLAN to signal a switch in the routing of an IP flow from a failing cellular connection to WLAN when using S2a Spatial Channel Module (SCM), which is problematic in the existing control plane signaling approach.

The process 300 further may include, at 320, receiving or transmitting (sending) an IFCP capability request or response between the UE and the PGW to indicate NB-IFOM capability supported by the UE or the PGW. In some embodiments, IFCP messages of IFCP Capability Request/Response (e.g., as illustrated at Table 1 and Table 2) may be used to query a UE or a PGW for their NB-IFOM capability. In various embodiments, the UE or the PGW may check for support of Network Based IP Flow Mobility (NBIFOM) with the other peer, which responds with a Boolean NBI-FOM Capability Support indicating whether NBIFOM Capability is supported or not. Therefore, the UE and the PGW may communicate their respective NBIFOM capability.

TABLE 1

IFCP Capability Request.

| IEI | Information Element | Type/Reference | Presence | Format | Length |
|---|---|---|---|---|---|
| | IFCP Capability request message identity | Message type | M | V | |
| | Procedure transaction identity | Transaction identifier | M | V | |
| | NBIFOM Capability Support | BOOLEAN | M | V | |

TABLE 2

IFCP Capability Response.

| IEI | Information Element | Type/Reference | Presence | Format | Length |
|---|---|---|---|---|---|
| | IFCP Capability response message identity | Message type | M | V | |
| | Procedure transaction identity | Transaction identifier | M | V | |
| | NBIFOM Capability Support | BOOLEAN | M | V | |

Figure 4:
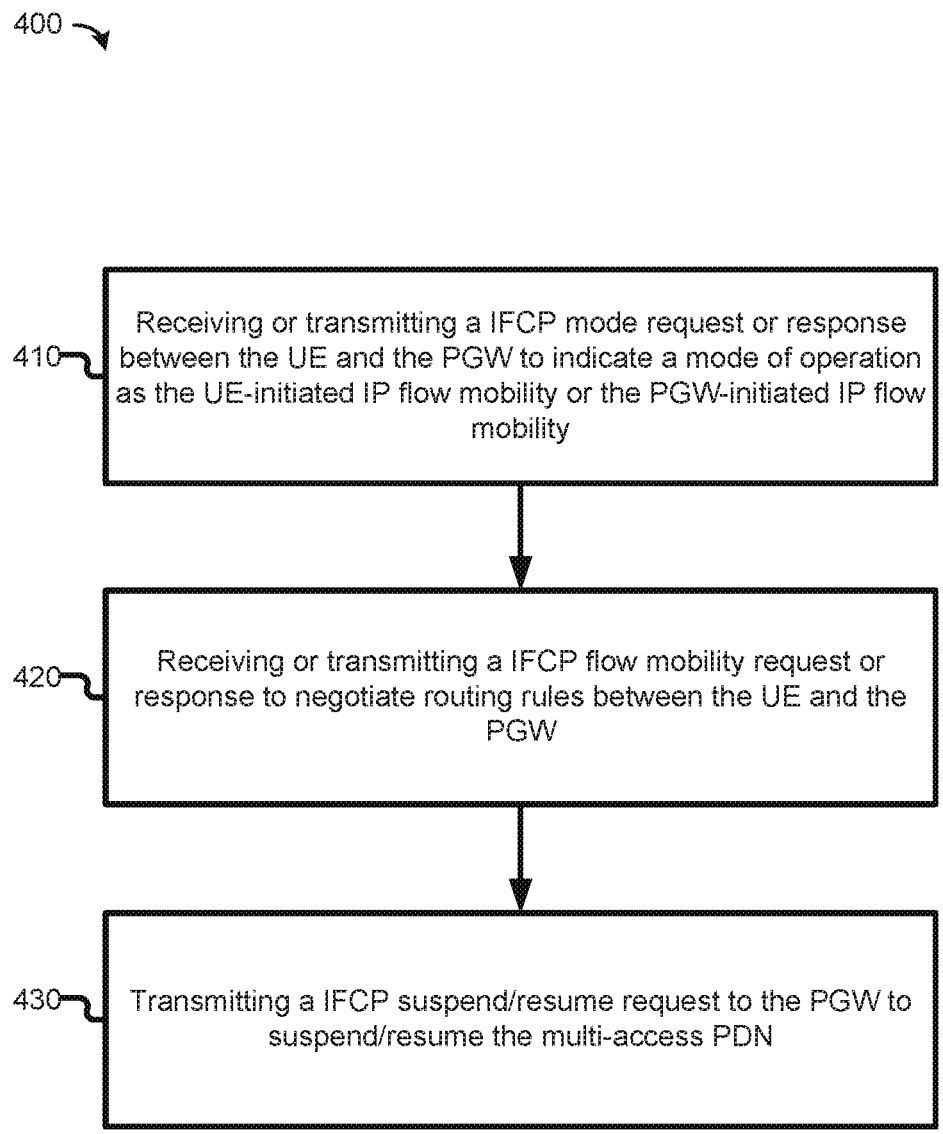
FIG. 4 is a flowchart illustrating another process for enabling IP flow mobility between a UE and a PGW, in accordance with various embodiments.

FIG. 4 is a flowchart illustrating another process 400 for enabling IP flow mobility between a UE and a PDN Gateway (PGW), in accordance with various embodiments. The process 400 may be performed by a UE, e.g., UE 110 of FIG. 1 or UE 210 of FIG. 2. In various embodiments, the process 400 may enable a UE to utilize the IFCP to manage IP flow mobility.

The process 400 may include, at 410, receiving or transmitting (sending) an IFCP mode request or response between the UE and the PGW to indicate a mode of operation as the UE-initiated IP flow mobility or the Network-initiated IP flow mobility. In some embodiments, IFCP messages of IFCP Mode Setup Request/Response (e.g., as illustrated at Table 3 and Table 4) may be used to setup either the UE Mode or Network mode of operation. The UE may set the UE mode of operation wherein UE initiates changes in routing rules. The PGW may accept/reject the rules and vice versa for Network mode of operation initiated by the PGW.

TABLE 3

IFCP Mode Setup Request.

| IEI | Information Element | Type/Reference | Presence | Format | Length |
|---|---|---|---|---|---|
| | IFCP Mode Setup request message identity | Message type | M | V | |
| | Procedure transaction identity | Transaction identifier | M | V | |
| | NBIFOM Mode | NBIFOM Mode Type (UE Initiated or Network Initiated) | M | TLV | |

TABLE 4

IFCP Mode Setup Response.

| IEI | Information Element | Type/Reference | Presence | Format | Length |
|---|---|---|---|---|---|
| | IFCP Mode Setup response message identity | Message type | M | V | |
| | Procedure transaction identity | Transaction identifier | M | V | |
| | Response Code | Result Type | M | TLV | |

The process 400 may further include, at 420, receiving or transmitting (sending) an IFCP flow mobility request or response to negotiate routing rules between the UE and the PGW. In some embodiments, IFCP messages of IFCP Flow Mobility Request/Response (e.g., as illustrated at Table 5 and Table 6) may be used by the UE or the PGW to send routing rules to the peer in a IFCP Flow Mobility request message, and the peer may respond in Response Code in IFCP Flow Mobility Response message whether the routing rules may be accepted.

In various embodiments, a routing rule may include various parameters, such as routing filter, routing access information, routing rule priority, routing rule identifier, etc. A routing filter may include IP header parameter values/ranges used to identify one or more IP flows. The routing access information may identify the access type where the IP flow shall be routed. For the purpose of matching user traffic against routing rules, the filters may be applied in the order of the routing rule priority. The routing rule identifier may uniquely identify a routing rule for one PDN Connection. The routing rule identifier may be allocated by the entity creating the routing rule, e.g., by the UE in UE-initiated NBIFOM mode and by the PGW in a Network-initiated NBIFOM mode. The routing rule information may be encapsulated in PCO datatype.

TABLE 5

IFCP Flow Mobility Request.

| IEI | Information Element | Type/Reference | Presence | Format | Length |
|---|---|---|---|---|---|
| | IFCP Flow Mobility request message identity | Message type | M | V | |
| | Procedure transaction identity | Transaction identifier | M | V | |
| | Access point name | Access point name | M | TLV | |
| | PDN connection ID | PDN connection ID | M | TLV | |
| 27 | Protocol configuration options/ Routing rules | Protocol configuration options | O | TLV | |

TABLE 6

IFCP flow Mobility Response.

| IEI | Information Element | Type/Reference | Presence | Format | Length |
|---|---|---|---|---|---|
| | IFCP Flow Mobility response message identity | Message type | M | V | |
| | Procedure transaction identity | Transaction identifier | M | V | |
| | PDN connection ID | PDN connection ID | M | TLV | |
| 27 | Protocol configuration options/ Routing Rules | Protocol configuration options | O | TLV | |
| | Response Code | Result Type | M | TLV | |

The process 400 may further include, at 430, transmitting (sending) an IFCP suspend/resume request to the PGW to suspend/resume the multi-access PDN. In various embodiments, the UE may transmit (send) a suspend request (e.g., as illustrated at Table 7) to the PGW to suspend specific PDN connections. Similarly, the PGW may send a suspend response (e.g., as illustrated at Table 8) to the UE to respond to the suspend request. By the same token, the UE may send a resume request (e.g., as illustrated at Table 9) to the PGW to resume specific PDN connections. Similarly, the PGW may send a resume response (e.g., as illustrated at Table 10) to the UE to respond to the resume request.

TABLE 7

IFCP Suspend Request.

| IEI | Information Element | Type/Reference | Presence | Format | Length |
|---|---|---|---|---|---|
| | IFCP Suspend request message identity | Message type | M | V | |

TABLE 7-continued

IFCP Suspend Request.

| IEI | Information Element | Type/Reference | Presence | Format | Length |
|---|---|---|---|---|---|
| | Procedure transaction identity | Transaction identifier | M | V | |
| | PDN connection ID | PDN connection ID | M | TLV | |

TABLE 8

IFCP Suspend Response.

| IEI | Information Element | Type/Reference | Presence | Format | Length |
|---|---|---|---|---|---|
| | IFCP Suspend response message identity | Message type | M | V | |
| | Procedure transaction identity | Transaction identifier | M | V | |
| | PDN connection ID | PDN connection ID | M | TLV | |
| | Response Code | Result Type | M | TLV | |

TABLE 9

IFCP Resume Request.

| IEI | Information Element | Type/Reference | Presence | Format | Length |
|---|---|---|---|---|---|
| | IFCP Resume request message identity | Message type | M | V | |
| | Procedure transaction identity | Transaction identifier | M | V | |
| | PDN connection ID | PDN connection ID | M | TLV | |

TABLE 10

IFCP Resume Response.

| IEI | Information Element | Type/Reference | Presence | Format | Length |
|---|---|---|---|---|---|
| | IFCP Resume response message identity | Message type | M | V | |
| | Procedure transaction identity | Transaction identifier | M | V | |
| | PDN connection ID | PDN connection ID | M | TLV | |
| | Response Code | Result Type | M | TLV | |

Figure 5:
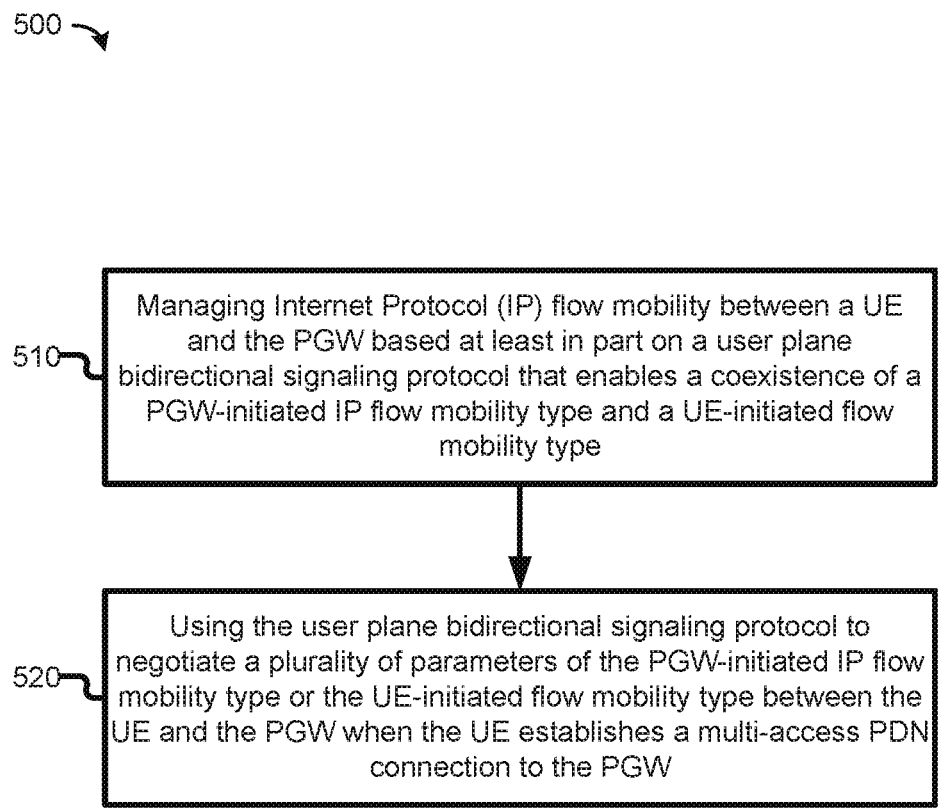
FIG. 5 is a flowchart illustrating yet another process for enabling IP flow mobility between a UE and a PGW, in accordance with various embodiments.

FIG. 5 is a flowchart illustrating yet another process 500 for enabling IP flow mobility between a UE and a PDN Gateway (PGW), in accordance with various embodiments. The process 500 may be performed by a PGW, e.g., the PGW 140 of FIG. 1 or PGW 220 of FIG. 2.

The process 500 may include, at 510, managing Internet Protocol (IP) flow mobility between a UE and the PGW based at least in part on a user plane bidirectional signaling protocol (e.g., the IFCP) that enables a coexistence of a Network-initiated IP flow mobility type and a UE-initiated flow mobility type. In some embodiments, the IFCP may enable a UE or a PGW to use a single procedure/message to move multiple IP flows.

In some embodiments, the IFCP may enable a UE or a PGW to negotiate, accept, or reject routing rules. In some embodiments, the IFCP may enable a UE or a PGW to transfer routing rules over any target network, including S2a SCM or a network utilizing PMIP. In some embodiments, the IFCP may reduce overhead when a PGW allows IFCP traffic on an NBIFOM PDN connection and may take this into account for its charging and usage monitoring counters. In some embodiments, the IFCP may enable a UE or a PGW to use IPSec or DTLS to counter any security impacts to prevent a malware from attacking the IFCP stack in the PGW.

The process 500 may further include, at 520, using the user plane bidirectional signaling protocol to negotiate a plurality of parameters of the Network-initiated IP flow mobility type or the UE-initiated flow mobility type between the UE and the PGW when the UE establishes a multi-access PDN connection to the PGW. Thus, UE-initiated NBIFOM may co-exist with Network-initiated NBIFOM.

IP Flow mobility may be initiated based on network policies (for example, PCC/PCRF rules) or based on client policies (for example, ANDSF or RAN rules) to support network-based flow mobility. Corresponding triggers for IP flow mobility may be initiated in the UE and the network. The IFCP may provide a mechanism for co-existence between these scenarios so that conflicts can be resolved and different deployment scenarios can be supported.

3GPP Rel-12 solution based on RAN rules specifies that APN-level offloading and mobility may be done on a per PDN Connection granularity. Hence, when RAN rules are satisfied, the UE moves the offloadable PDN connections from 3GPP to WLAN. The MME/SGSN indicates, via NAS signaling, the PDN Connections that are offloadable to WLAN. The RAN may be oblivious regarding which mobility solution is used and whether PDN level mobility or flow level mobility is used. With NBIFOM, it is not clear how RAN rules that govern PDN level mobility may affect flow level mobility. Thus, the IFCP provides a co-existence mechanism in conjunction with PCC/PCRF rules for NBIFOM.

The granularity for deciding what traffic may be offloaded to WLAN may be set on IP Flow level. The per RAT WLAN offloadability indication per PDN Connection may be used for NBIFOM PDN connections as well.

ANDSF rules may have preference (or priority) over RAN rules. If no ANDSF rule is present, then RAN rules may be used. ANDSF rules may always be used in roaming scenarios. In some embodiments, traffic may be routed to WLAN only if both client and network rules to move traffic to WLAN are satisfied. Otherwise, traffic may be routed on 3GPP access only, such as illustrated in the routing rule negotiation items of Table 11.

In various embodiments, a choice may be made between only allowing the UE to initiate IP flow mobility (UE-controlled mode) or only allowing the network to initiate IP flow mobility (NW-controlled mode). If the UE is provisioned with IFOM routing rules (for example, ANDSF rules) or RAN Rules, the UE may request UE-controlled mode during IFCP session setup. If the UE does not request UE-controlled mode, the network may inform the UE that NW-controlled mode will be used. The UE can use the ANDSF routing rules or RAN rules when the UE-controlled mode is negotiated. When the NW-controlled mode is negotiated, the UE does not use any ANDSF routing rules or RAN rules (it uses the network-provided rules instead).

TABLE 11

Routing Rule Negotiation.

| Item | ANDSF Rule Status | RAN Rule status | Network Rule Status | IP Flow route |
|---|---|---|---|---|
| 1 | WLAN | 3GPP | 3GPP | 3GPP |
| 2 | WLAN | WLAN | 3GPP | 3GPP |
| 3 | 3GPP | 3GPP | 3GPP | 3GPP |
| 4 | 3GPP | WLAN | 3GPP | 3GPP |
| 5 | WLAN | 3GPP | WLAN | WLAN |
| 6 | WLAN | WLAN | WLAN | WLAN |
| 7 | 3GPP | 3GPP | WLAN | 3GPP |
| 8 | 3GPP | WLAN | WLAN | 3GPP |
| 9 | None | WLAN | WLAN | WLAN |

A UE may request UE Mode of operation, and the network may accept that request. If no network rules apply, then the UE mode of operation may be selected. In some embodiments, network may have PCC or PCRF rules. Network may request NW mode of operation, and UE may accept that. If no UE rules are provided, then a Network mode of operation may be selected. In some embodiments, if both a UE and a Network have rules, the Network may gain precedence over the UE, and NW mode of operation may be selected. In some embodiments, the selected rules may be applied based on the agreed mode of operation, and the IP Flow routing may be selected accordingly.

In some embodiments, IP flow routing may include one or more options. When a UE has ANDSF rules and RAN rules, the ANDSF rules may take priority of the RAN rules. When a UE has either ANDSF rules and RAN rules, the UE may request a UE mode of operation for IP flow routing to the network. If the network does not have IP flow routing rules, the network may accept the UE request and confirm that IP flow routing is to be performed using the UE mode of operation for IP flow routing. If the network does have IP flow routing rules, the network may reject the UE request and may make a network request to the UE to use the network rules for IP flow routing, and the UE may accept that request. If the UE does not have IP flow routing rules, the network may make a request for IP flow routing based on network rules. The UE may accept the request and use the network rules. If both the UE and the network have IP flow routing rules, the network rules may take priority over the UE rules.

UE 110 and PGW 140 of FIG. 1 or UE 210 and PGW 220 of FIG. 2 may be implemented into a system using any suitable hardware, firmware, and/or software configured as desired. FIG. 6 illustrates, for an embodiment, an example system 600 comprising radio frequency (RF) circuitry 610, baseband circuitry 620, application circuitry 630, memory/storage 640, display 650, camera 660, sensor 670, and input/output (I/O) interface 680, coupled with each other at least as shown, which may be used to implement UE 110, PGW 140 of FIG. 1 or UE 210, PGW 220 of FIG. 2.

The application circuitry 630 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 640 and configured to execute instructions stored in the memory/storage 640 to enable various applications and/or operating systems running on the system 600.

The baseband circuitry 620 may include circuitry such as, but not limited to, one or more single-core or multi-core processors. The processor(s) may include a baseband processor. The baseband circuitry 620 may handle various radio control functions that enable communication with one or more radio networks via the RF circuitry 610. The radio control functions may include, but are not limited to, signal modulation, encoding, decoding, radio frequency shifting, etc. In some embodiments, the baseband circuitry 620 may provide for communication compatible with one or more radio technologies. For example, in some embodiments, the baseband circuitry 620 may support communication with an EUTRAN and/or other WMAN, a WLAN, or a WPAN. Embodiments in which the baseband circuitry 620 is configured to support radio communications of more than one wireless protocol may be referred to as multi-mode baseband circuitry.

In various embodiments, baseband circuitry 620 may include circuitry to operate with signals that are not strictly considered as being in a baseband frequency. For example, in some embodiments, baseband circuitry 620 may include circuitry to operate with signals having an intermediate frequency, which is between a baseband frequency and a radio frequency.

In some embodiments, the processing circuitry 216 or 226 of FIG. 2 may be embodied in the application circuitry 630 and/or the baseband circuitry 620.

RF circuitry 610 may enable communication with wireless networks using modulated electromagnetic radiation through a non-solid medium. In various embodiments, the RF circuitry 610 may include switches, filters, amplifiers, etc., to facilitate the communication with the wireless network.

In various embodiments, RF circuitry 610 may include circuitry to operate with signals that are not strictly considered as being in a radio frequency. For example, in some embodiments, RF circuitry 610 may include circuitry to operate with signals having an intermediate frequency, which is between a baseband frequency and a radio frequency.

In some embodiments, the signaling circuitry 214 or 224 of FIG. 2 may be embodied in the RF circuitry 610.

In some embodiments, some or all of the constituent components of the baseband circuitry 620, the application circuitry 630, and/or the memory/storage 640 may be implemented together on a system on a chip (SOC).

Memory/storage 640 may be used to load and store data and/or instructions, for example, for system 600. Memory/storage 640 for one embodiment may include any combination of suitable volatile memory (e.g., dynamic random access memory (DRAM)) and/or non-volatile memory (e.g., flash memory).

In various embodiments, the I/O interface 680 may include one or more user interfaces to enable user interaction with the system 600 and/or peripheral component interfaces to enable peripheral component interaction with the system 600. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 670 may include one or more sensing devices to determine environmental conditions and/or location information related to the system 600. In some embodiments, the sensors may include, but are not limited to, a gyro sensor, an accelerometer, a proximity sensor, an ambient light sensor, and a positioning unit. The positioning unit may also be part of, or interact with, the baseband circuitry 620 and/or RF circuitry 610 to communicate with components of a positioning network, e.g., a global positioning system (GPS) satellite.

In various embodiments, the display 650 may include a display, e.g., a liquid crystal display, a touch screen display, etc. In some embodiments, the camera 660 may include many molded plastic aspheric lens elements made with varying dispersion and refractive indexes. In some embodiments, the camera 660 may include two or more lenses to capture three-dimensional images for stereo photography.

In various embodiments, the system 600 may be a mobile computing device such as, but not limited to, a smartphone, a tablet computing device, a netbook, an ultrabook, a laptop computing device, etc. In various embodiments, system 600 may have more or fewer components, and/or different architectures.

Figure 7:
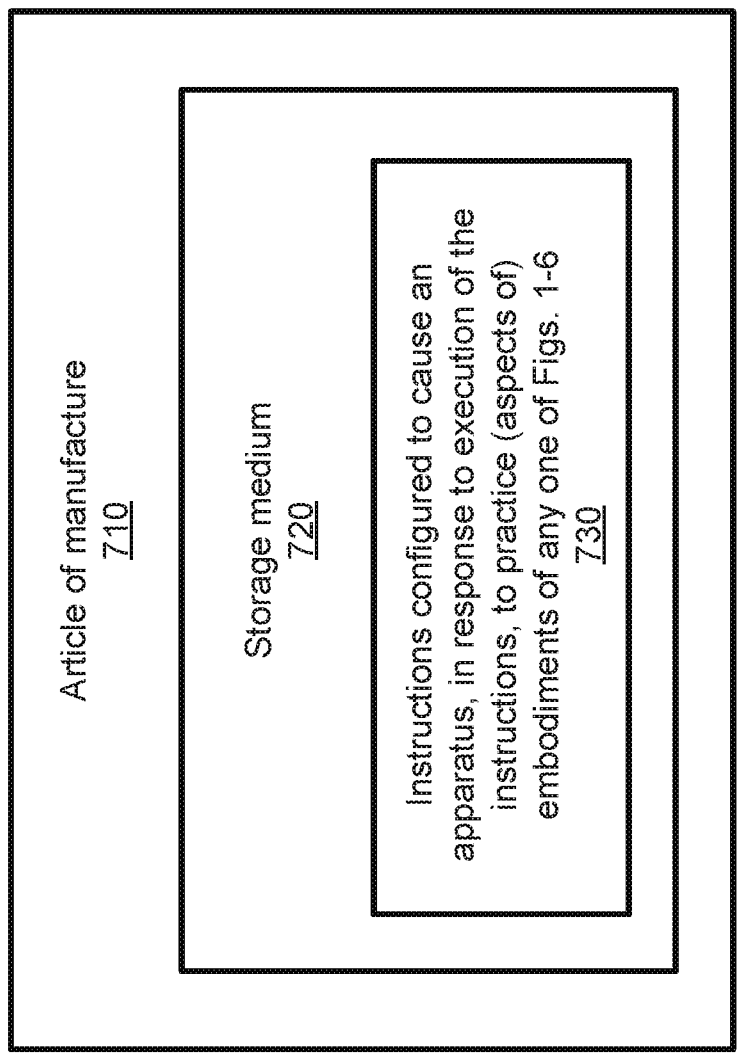
FIG. 7 illustrates an article of manufacture having programming instructions, incorporating aspects of the present disclosure, in accordance with various embodiments.

FIG. 7 illustrates an article of manufacture 710 having programming instructions, incorporating aspects of the present disclosure, in accordance with various embodiments. In various embodiments, an article of manufacture may be employed to implement various embodiments of the present disclosure. As shown, the article of manufacture 710 may include a computer-readable non-transitory storage medium 720 where instructions 730 are configured to practice embodiments of or aspects of embodiments of any one of the processes described herein. The storage medium 720 may represent a broad range of persistent storage media known in the art, including but not limited to flash memory, dynamic random access memory, static random access memory, an optical disk, a magnetic disk, etc. In embodiments, computer-readable storage medium 720 may include one or more computer-readable non-transitory storage media. In other embodiments, computer-readable storage medium 720 may be transitory, such as signals, encoded with instructions 730.

In various embodiments, instructions 730 may enable an apparatus, in response to its execution by the apparatus, to perform various operations described herein. As an example, storage medium 720 may include instructions 730 configured to cause an apparatus, e.g., UE 110 of FIG. 1 or UE 210 of FIG. 2, to practice some aspects of IP flow mobility control, e.g., as illustrated in process 300 of FIG. 3 or process 400 of FIG. 4, in accordance with embodiments of the present disclosure. As another example, storage medium 720 may include instructions 730 configured to cause an apparatus, e.g., PGW 140 of FIG. 1 or PGW 220 of FIG. 2, to practice some aspects of IP flow mobility control, e.g., as illustrated in process 500 of FIG. 5, in accordance with embodiments of the present disclosure.

EXAMPLES

The following paragraphs describe examples of various embodiments disclosed herein.

A first kind of examples may include an apparatus, such as a user equipment (UE), which may include signaling circuitry to establish a multi-access packet data network (PDN) connection with at least two radio access technologies to enable Internet Protocol (IP) flow mobility based on the at least two radio access technologies; and processing circuitry, coupled to the signaling circuitry, to control IP flow mobility between the UE and a PDN Gateway (PGW) based on a bidirectional signaling protocol that enables a coexistence of IP flow mobility initiated based on network policies and IP flow mobility initiated based on UE policies.

Another example may include the apparatus of any of the preceding first kind of examples, wherein the bidirectional signaling protocol is terminated at the UE and the PGW, and the processing circuitry is to negotiate routing rules between the UE and the PGW using the bidirectional signaling protocol over Transmission Control Protocol (TCP)/IP or User Datagram Protocol (UDP)/IP.

Another example may include the apparatus of any of the preceding first kind of examples, wherein the signaling circuitry is to exchange routing rules between the UE and the PGW based on the negotiation.

Another example may include the apparatus of any of the preceding first kind of examples, wherein the processing circuitry is to use the bidirectional signaling protocol to negotiate Network-based IP flow mobility (NB-IFOM) capability between the UE and the PGW when the multi-access PDN connection is established.

Another example may include the apparatus of any of the preceding first kind of examples, wherein the processing circuitry is to use the bidirectional signaling protocol to trigger UE-initiated IP flow mobility and negotiate routing rules based on the network policies and the UE policies.

Another example may include the apparatus of any of the preceding first kind of examples, wherein the processing circuitry is to use the bidirectional signaling protocol to accept or reject network-initiated IP flow mobility and negotiate routing rules based on the network policies and the UE policies.

Another example may include the apparatus of any of the preceding first kind of examples, wherein the at least two radio access technologies comprises a WiFi technology to access a wireless local area network (WLAN), wherein the processing circuitry is to notify the PGW using the bidirectional signaling protocol when the UE is out of the WLAN, and request the PGW to stop sending downlink packages over the WLAN to the UE.

Another example may include the apparatus of any of the preceding first kind of examples, wherein the processing circuitry is to notify the PGW using the bidirectional signaling protocol when the UE is back in the WLAN, and request the PGW to resume sending downlink packages over the WLAN to the UE.

A second kind of examples may include a method, comprising: enabling IP flow mobility between a UE and a PDN Gateway (PGW) based at least in part on an IP Flow mobility Control Protocol (IFCP) that enables a coexistence of UE-initiated IP flow mobility and Network-initiated IP flow mobility with a multi-access packet data network (PDN) connection; and receiving or sending an IFCP capability request or response between the UE and the PGW to indicate a type of IP flow mobility (NB-IFOM) capability supported by the UE or the PGW.

Another example may include the method of any of the preceding second kind of examples, and the method further include receiving or sending an IFCP mode request or response between the UE and the PGW to indicate a mode of operation as the UE-initiated IP flow mobility or the Network-initiated IP flow mobility.

Another example may include the method of any of the preceding second kind of examples, and the method further include sending an IFCP suspend request to the PGW to suspend the multi-access PDN; and sending an IFCP resume request to the PGW to resume the multi-access PDN.

Another example may include the method of any of the preceding second kind of examples, and the method further include receiving or sending an IFCP flow mobility request or response to negotiate routing rules between the UE and the PGW.

Another example may include the method of any of the preceding second kind of examples, and the method further include prioritizing Access Network Discovery and Selection Function (ANDSF) rules over Radio Access Network (RAN) rules for routing traffic; or prioritizing Network-initiated routing rules over UE-initiated routing rules.

Another example may include an apparatus comprising means to perform any of the preceding second kind of examples.

Another example may include one or more non-transitory computer readable media comprising instructions to cause an apparatus, upon execution of the instructions by one or more processors of the apparatus, to perform any of the preceding second kind of examples.

A third kind of examples may include an apparatus, such as a packet data network gateway (PGW), which may include a communication module to communicate with a UE via a multi-access packet data network (PDN) connection; and a control module to manage Internet Protocol (IP) flow mobility between the UE and the PGW based at least in part on a user plane bidirectional signaling protocol that enables a coexistence of a Network-initiated IP flow mobility type the and a UE-initiated flow mobility type.

Another example may include the apparatus of any of the preceding third kind of examples, wherein the control module is to use the user plane bidirectional signaling protocol to negotiate a plurality of capability parameters of the Network-initiated IP flow mobility type or the UE-initiated flow mobility type between the UE and the PGW when the UE establishes the multi-access PDN connection to the PGW.

Another example may include the apparatus of any of the preceding third kind of examples, wherein the control module is to use the user plane bidirectional signaling protocol to accept or reject a UE-initiated IP flow mobility session.

Another example may include the apparatus of any of the preceding third kind of examples, wherein the control module is to use the user plane bidirectional signaling protocol to trigger a Network-initiated IP flow mobility session and transfer routing rules based on network policies to the UE.

A forth kind of examples may include a method, comprising: managing Internet Protocol (IP) flow mobility between a UE and the PGW based at least in part on a user plane bidirectional signaling protocol that enables a coexistence of a Network-initiated IP flow mobility type and a UE-initiated flow mobility type; and using the user plane bidirectional signaling protocol to negotiate a plurality of capability parameters of the Network-initiated IP flow mobility type or the UE-initiated flow mobility type between the UE and the PGW when the UE establishes a multi-access PDN connection to the PGW Another example may include the method of any of the preceding forth kind of examples, and the method further include using the user plane bidirectional signaling protocol to trigger a Network-initiated IP flow mobility session based on Policy and Charging Control (PCC) or Policy and Charging Rule Function (PCRF).

Another example may include the method of any of the preceding forth kind of examples, and the method further include using the user plane bidirectional signaling protocol to accept or reject a UE-initiated IP flow mobility session.

Another example may include the method of any of the preceding forth kind of examples, and the method further include routing traffic via a WLAN only if the PGW and the UE agree on a WLAN based routing rule based on the user plane bidirectional signaling protocol.

Another example may include the method of any of the preceding forth kind of examples, and the method further include prioritizing Network-initiated routing rules over UE-initiated routing rules.

Another example may include the method of any of the preceding forth kind of examples, and the method further include transferring Network-initiated routing rules to the UE using the user plane bidirectional signaling protocol.

Another example may include the method of any of the preceding forth kind of examples, and the method further include receiving an IFCP flow mobility request or send an IFCP flow mobility response to negotiate routing rules between the PGW and the UE.

Another example may include an apparatus comprising means to perform any of the preceding forth kind of examples.

Another example may include one or more non-transitory computer readable media comprising instructions to cause an apparatus, upon execution of the instructions by one or more processors of the apparatus, to perform any of the preceding forth kind of examples.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media having instructions that, when executed by one or more processors, cause a user equipment (UE) to:
    establish a multi-access packet data network (PDN) connection with at least two radio access technologies to enable Internet Protocol (IP) flow mobility based on the at least two radio access technologies, wherein the at least two radio access technologies comprises a WiFi technology to access a wireless local are network (WLAN);
    control IP flow mobility based on bidirectional signaling protocol between, and terminated at, the IE and a PDN Gateway (PGW) that enables a coexistence of IP flow mobility initiated based on network policies and an IP flow mobility control protocol (IFCP) initiated based on UE policies;
    receive an IFCP capability request from the PGW to indicate a network-based IP flow mobility (NB-IFOM) capability supported by the network, or send an IFCP capability response to the PGW to indicate an NB-IFOM capability supported by the UE;
    negotiate routing eules between the UE and the PGW using the bidirectional signaling protocol over Transmission Control Protocol (TCP)/IP or User Datagram Protocol (UDP)/IP;
    determine that the UE is out of coverage of the WLAN;
    in response to the determination that the UE is back in coverage of the WLAN, notify the PGW using the bidirectional signaling protocol when the UE is back in the coverage of the WLAN and request the PGW to resume sending downlink packs over the WLAN to the UE.

2. The one or more non-transitory, computer-readable media of claim 1, wherein the instructions, when executed, are to further cause the UE to exchange routing rules with the PGW based on the negotiation.

3. The one or more non-transitory, computer-readable media of claim 1, wherein the instructions, when executed, further cause the UE to use the bidirectional signaling protocol to trigger UE-initiated IP flow mobility and negotiate routing rules based on the network policies and the UE policies.

4. The one or more non-transitory, computer-readable media of claim 1, wherein the instructions, when executed, further cause the UE to use the bidirectional signaling protocol to accept or reject network-initiated IP flow mobility and negotiate routing rules based on the network policies and the UE polices.

5. An apparatus to be implemented in a user equipment (UE), the apparatus comprising:
  processing circuitry to generate a plurality of messages according to an Internet protocol (IP) flow mobility control protocol (IFCP) between the UE and a packet data network gateway (PGW) to provide network- and client-initiated IP flow mobility between at least two radio access technologies of a multi-access packet data network (PDN) connection, wherein the at least two radio access technologies comprises a WiFi technology to access a wireless local area network (WLAN), wherein the processing circuitry is further to receive an IFCP flow mobility request from the PGW to indicate a network-based IP flow mobility (NB-IFOM) capability supported by the network; and
  signaling circuitry to send the plurality of messages to the PGW, wherein a first message of the plurality of messages is to negotiate routing rules between the UE and the PGW using a bidirectional signaling protocol between, and terminated at, the UE and PGW over Transmission Control Protocol (TCP)/IP or User Datagram Protocol (UDP)/IP, wherein a second message of the plurality of messages is to notify, over TCP/IP or UDP/IP, the PGW when the UE is out of coverage of the WLAN and request the PGW to stop sending downlink packages over the WLAN to the UE, and wherein a third message of the plurality of messages is to notify the PGW over TCP/IP or UDP/IP when the UE is back in the coverage of the WLAN and request the PGW to resume sending downlink packs over the WLAN to the UE.

6. The apparatus of claim 5, wherein the IFCP flow mobility request includes an indication of a transaction identifier, an access point name, a PDN connection identifier, or one or more configuration options or routing rules.

7. The apparatus of claim 6, wherein the IFCP flow mobility request is a request to move a plurality of IP flows.

8. The apparatus of claim 5, wherein the network-initiated IP flow mobility operation is based on a policy and charging control (PCC) or policy and charging rule function (PCRF).

9. The apparatus of claim 5, wherein the plurality of messages includes a message to accept or reject the IFCP flow mobility request.

* * * * *

UNITED STATES PATENT AND TRADEMARK OFFICE
CERTIFICATE OF CORRECTION

PATENT NO. : 11,140,736 B2  
APPLICATION NO. : 16/447855  
DATED : October 5, 2021  
INVENTOR(S) : Gupta Page 1 of 1

It is certified that error appears in the above-identified patent and that said Letters Patent is hereby corrected as shown below:

In the Claims

Column 18
Line 55, correct "eules" after "negotiate routing" and before "between the UE" to "rules".

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*